(12) United States Patent
Schuman

(10) Patent No.: US 9,207,313 B2
(45) Date of Patent: Dec. 8, 2015

(54) MIMO ANGLE ESTIMATION WITH SIMULTANEOUS MAINLOBE JAMMER CANCELLATION

(71) Applicant: SRC, INC., North Syracuse, NY (US)

(72) Inventor: Harvey K. Schuman, Cazenovia, NY (US)

(73) Assignee: SRC, INC., North Syracuse, NY (US)

( * ) Notice: Subject to any disclaimer, the term of this patent is extended or adjusted under 35 U.S.C. 154(b) by 401 days.

(21) Appl. No.: 13/792,603

(22) Filed: Mar. 11, 2013

(65) Prior Publication Data

US 2015/0323650 A1    Nov. 12, 2015

(51) Int. Cl.
*G01S 7/36* (2006.01)
*G01S 13/36* (2006.01)
*G01S 7/28* (2006.01)
*G01S 13/524* (2006.01)
*H01Q 3/26* (2006.01)
(Continued)

(52) U.S. Cl.
CPC .............. *G01S 13/36* (2013.01); *G01S 7/2813* (2013.01); *G01S 13/5244* (2013.01); *H01Q 3/2605* (2013.01); *H01Q 3/2611* (2013.01); *H04B 7/086* (2013.01); *H04K 3/228* (2013.01); *G01S 7/4026* (2013.01); *G01S 13/4463* (2013.01)

(58) Field of Classification Search
CPC ..... G01S 7/36; G01S 13/284; G01S 13/4463; G01S 13/5244; G01S 7/2813; G01S 2013/0245; G01S 7/4026; H01Q 3/2611; H01Q 3/2605; H04K 3/228; H04B 7/0617; H04B 7/086

USPC .......................... 342/17–19, 80, 89, 147–149
See application file for complete search history.

(56) References Cited

U.S. PATENT DOCUMENTS 5,600,326 A * 2/1997 Yu et al. ......................... 342/17
5,952,965 A   9/1999 Kowalski
(Continued)

FOREIGN PATENT DOCUMENTS

CN    101349748    1/2009
CN    101770022    12/2009
CN    101799535    8/2010

OTHER PUBLICATIONS

Brown, M.; Mirkin, M.; Rabideau, D., "Phased array antenna calibration using airborne radar clutter and MIMO," Signals, Systems and Computers, 2014 48th Asilomar Conference on , vol., no., pp. 1150,1156, Nov. 2-5, 2014.*

(Continued)

*Primary Examiner* — John B Sotomayor
(74) *Attorney, Agent, or Firm* — Blaine T. Bettinger; George R. McGuire; Bond Schoeneck & King, PLLC

(57) ABSTRACT

A radar system includes a transmit antenna array having subarrays disposed at predetermined positions. An orthogonal waveform signal is directed to a corresponding one of the subarrays. On receive, an adaptive processor derives a plurality of adaptive weight factors from a plurality of receive signals and applies them to the receive signals to obtain a jammer cancelled signal. That signal is separated into its orthogonal waveform components by passing it through a bank of correlators. The correlator system provides a plurality of unique receive signals substantially corresponding one-to-one to the unique transmit subarrays. The receive beamformer derives an angular estimate of at least one target relative to boresight from the unique receive signals.

21 Claims, 5 Drawing Sheets

(51) Int. Cl.
*H04K 3/00* (2006.01)
*H04B 7/08* (2006.01)
*G01S 7/40* (2006.01)
*G01S 13/44* (2006.01)

(56) References Cited

U.S. PATENT DOCUMENTS

| | | | |
|---|---|---|---|
| 6,784,838 | B2 | 8/2004 | Howell |
| 7,522,095 | B1 | 4/2009 | Wasiewicz et al. |
| 7,671,789 | B1* | 3/2010 | Yu ................................ 342/152 |
| 7,714,782 | B2 | 5/2010 | Davis et al. |
| 7,859,451 | B2 | 12/2010 | Yu et al. |
| 8,466,829 | B1* | 6/2013 | Volman et al. ................ 342/147 |
| 8,817,927 | B2* | 8/2014 | Zai et al. ....................... 375/349 |
| 2003/0085833 | A1 | 5/2003 | Yu |
| 2010/0123617 | A1* | 5/2010 | Yu et al. ........................ 342/149 |
| 2014/0266868 | A1* | 9/2014 | Schuman .................... 342/25 B |

OTHER PUBLICATIONS

Nohara et al. "Adaptive Mainbeam Jamming Suppression for Multi-Function Radars," Proceedings of the 1998 IEEE Radar Conference, May 1998. p. 207-212. Available at http://ieeexplore.ieee.org/stamp.jsp?tp=&arnumber=678002.

Xu et al. "Target Detection and Parameter Estimation for MIMO Radar Systems," IEEE Transactions on Aerospace and Electronic Systems, 2008. vol. 44, No. 3, p. 927-939.

Roberts et al. "MIMO Radar Receiver Design," IEEE Radar Conference, May 2008. Available at http://ieeexplore.ieee.org/stamp/stamp.jsp?tp=&arnumber=4720925.

* cited by examiner

MIMO ANGLE ESTIMATION WITH SIMULTANEOUS MAINLOBE JAMMER CANCELLATION

BACKGROUND OF THE INVENTION

1. Field of the Invention

The present invention relates generally to radar techniques, and particularly to determining the angular direction of a radar target in a jamming environment.

2. Technical Background

The word "radar" is an acronym for radio detection and ranging that was coined by the U.S. Navy in the 1940s when the technology was in its infancy. Essentially, a radar system is one that alternately transmits radio frequency (RF) signals into a given search volume and then listens for reflections. By properly processing the radar returns, a radar system can determine the direction, range, altitude and/or speed of a target. Nowadays radar is used in a variety of ways. For example, the weatherman uses radar to track rain and snow storms. Police use radar to determine the speed of motorists. Civil aviation uses radar for air traffic control purposes. The military uses radar to track aircraft, ships, terrain and missiles. Needless to say, this is a small list of examples. The present invention, however, is directed toward determining the direction, or angular direction of a target relative to a radar, in the presence of jamming.

A monopulse radar system is type of radar that is often used for this task and can be formed using reflector antennas, phased arrays and etc. The term "monopulse" refers to the fact that the angle of arrival is estimated from data in a single pulse. The receive antenna may be divided into two segments such that the antenna receiver processes two signals in order to form two receive beams. The first beam is the sum beam ($\Sigma$) and the second is the difference beam ($\Delta$). The amplitude of the sum beam ($\Sigma$) is symmetrical, with its maximum at the boresight. The amplitude of the difference beam ($\Delta$) is antisymmetrical and is equal to zero at the boresight. In an array antenna, the angular direction of a target with respect to boresight ($\theta$) is determined by computing a simple function of the "monopulse ratio," $\Delta(\theta)/\Sigma(\theta)$, and comparing that value with a table of prerecorded such values versus angle of arrival. As those skilled in the art will appreciate, sometimes amplitude patterns of squinted beams are subtracted and added to form the $\Delta$ and $\Sigma$ beams, and the simple function is simply the formed ratio; this type of monopulse is referred to as amplitude comparison monopulse. Sometimes the complex patterns of displaced phase center antenna beams are subtracted and added and the simple function is to extract the real part of the ratio. This second type of monopulse is referred to as full vector monopulse. This patent applies to both types of monopulse, but details below apply particularly to full vector monopulse. In practice, before the system is put in the field, the antenna is measured and calibrated such that the angular direction ($\theta$) values of the monopulse table are accurate. This technique can also be employed in a planar phased array antenna to provide both azimuth angles ($\theta az$) and elevation angles ($\theta el$). Briefly, the rectangular or planar phased array is divided into four quadrants on the receive side to derive a monopulse ratio for both the estimated azimuth angle ($\theta az$) and the estimated elevation angle ($\theta el$).

One drawback to the above stated monopulse techniques for estimating the target angle ($\theta$) relative to the antenna boresight is that they fail in the presence of main lobe jamming because the jamming noise renders the values in the look-up table substantially useless. The conventional approach to solving this jamming problem was introduced approximately 25 years ago by Applebaum and Wasiewicz, and provides a method for adaptively canceling a mainlobe jammer without suffering monopulse ratio distortion. In this approach, a linear array is divided into two large partially overlapped subarrays, with each subarray having an identical number of antenna elements. The conventional approach adaptively determines the individual weights ascribed to each to cancel the jamming signal. These weights are essentially the same for each subarray such that the adapted outputs are added to form a product sum $\Sigma(\theta)$ beam and subtracted to form a product difference $\Delta(\theta)$ beam. The difference/sum ratio [$\Delta(\theta)/\Sigma(\theta)$] is essentially independent of jammer cancellation because the jammer cancellation weights appear grouped in an identical factor of each subarray pattern and divide out when forming the ratio. One drawback associated with this approach is that the two partially overlapped subarrays are composed of different antenna elements, feedlines, and, if digital, A/D converters and receivers. The cancellation weights reflect these differences and they, in turn, limit the monopulse accuracy.

The approach described above has been extended by Applebaum and Wasiewicz to apply to rectangular aperture planar arrays with row-column weighting. As described above, rectangular planar arrays can be employed to provide azimuth difference/sum beams and elevation difference/sum beams for angle estimation purposes. (This method has been further extended to nonrectangular apertures by employing pattern synthesis to create product beams.) The extended approach creates azimuth product beams (made possible by row-column weighting or pattern synthesis) for cancellation and elevation product beams for azimuth angle estimation. The azimuth product beams are canceled out when the elevation angle estimation ratio is calculated. In order to obtain azimuth angle estimate, the process is reversed. One drawback to this approach is that it requires two sets of adaptive weights and controls, and in other words, two sets of adaptive beam forming hardware, or for digitized arrays, twice the digital processing, are required. More importantly, in all of these methods the receive aperture is shared by the jammer cancellation and angle estimation functions in some manner so that the performance of each are suboptimal. In particular, the aperture weight distribution appropriate for one function is not appropriate for the other, and so the aperture must be divided in some manner. In the planar array case, although the entire aperture is used in both functions, the post adaptive beams form line nulls that pass through the jammer angle, as opposed to the optimal point nulls.

Consider alternatively a straight-forward conventional approach that uses the entire aperture for canceling the jammer in the sum beam and the entire aperture for cancelling the jammer in the difference beam. Here, for planar arrays, point nulls are formed in the respective beams at the jammer angles. Adaptive nulling is applied to cancel the main lobe jamming in forming the sum beam and again in forming the difference beam by simply introducing sum and difference steering vectors in the weight computations for the respective beams.

FIG. 4 is a chart illustrating the post adaptive sum beam for the conventional approach. The top arc-shaped curve corresponds to a return that does not include jamming. The remaining three curves correspond to mainlobe jamming at three different angles. Adaptation to main lobe jamming has the effect of shifting the main lobe away from the angular direction of jammer. FIG. 5 is a chart illustrating the post adaptive difference beam for the conventional system. The difference beam substantially centered about 0° represents the "no main lobe jamming" case. When the conventional system adapts to main lobe jamming, it has the effect of shifting the difference pattern null to the angular direction of the jammer.

FIG. 6 is a chart illustrating the monopulse ratio for this conventional system. The system without jamming provides a clean antisymmetrical plot that passes through the origin (i.e., at zero amplitude, zero angle) as expected. In all three jamming cases, however, the angle estimation ratio deteriorates severely with jamming. The main reason for this is the loss of a null at the origin in the post adaptive difference beam (FIG. 5).

What is needed, therefore, is a system and method for monopulse angle estimation that addresses the drawbacks described above. A system is needed that applies adaptive jammer cancellation to the angle estimation process without distorting the sum and difference beams and without having to share the receive antenna aperture between the estimation and cancellation processes. Jammer cancellation is more effective if the entire aperture is applied optimally to cancelling the jammer. In this manner, an aperture weight distribution can be determined that is optimal for both suppressing jamming and maintaining sufficient target signal strength.

SUMMARY OF THE INVENTION

The present invention addresses the needs described above by providing a system and method for monopulse angle estimation that addresses the drawbacks described above. The system of the present invention applies adaptive jammer cancellation to the angle estimation process without distorting the sum and difference beams and without having to share the receive antenna aperture between the estimation and cancellation processes. The jammer cancellation method of the present invention is more effective than conventional methods because the entire aperture is optimally applied to cancelling the jammer. In this manner, the present invention determines an aperture weight distribution that is optimal for both suppressing jamming and maintaining sufficient target signal strength.

One aspect of the present invention is directed to a radar system configured to detect at least one target. The system includes a transmit antenna array having a plurality of antenna elements arranged within a plurality of subarrays, each subarray being disposed at predetermined position relative to an antenna array boresight. A transmit beamformer is coupled to the transmit antenna array, the transmit beamformer being configured to generate a plurality of unique transmit waveforms. Each of the unique transmit waveforms is directed to a corresponding one of the plurality of subarrays such that each of the plurality of antenna elements within a subarray transmits the same unique transmit waveform. An adaptive processor is coupled to a receive antenna array and configured to derive a plurality of adaptive weight factors from a plurality of receive signals provided by the plurality of antenna elements. The adaptive processor applies the plurality of adaptive weight factors to the entire receive array to provide a plurality of weighted signals. A correlator system includes a plurality of correlator elements coupled to the adaptive processor. Each correlator element is configured to detect signal components corresponding to one unique transmit waveform from each of the plurality of weighted signals and provide one unique weighted receive waveform based on the detected signal components, whereby the correlator system provides a plurality of unique receive waveforms substantially corresponding to the plurality of unique transmit waveforms. A receive beamformer is coupled to the correlation system. The receive beamformer is configured to derive an angular estimate of at least one target relative to the boresight from the plurality of unique receive waveforms.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention and together with the description serve to explain the principles and operation of the invention.

DETAILED DESCRIPTION

Figure 1:
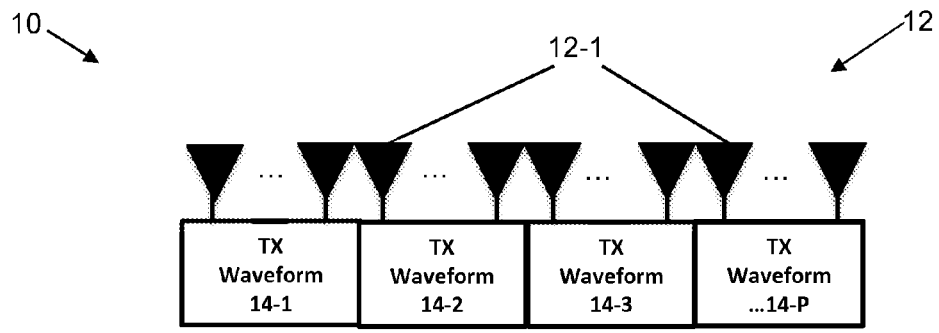
FIG. 1 is a diagrammatic depiction of a transmitter in accordance with the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the receiver of the present invention is shown in FIG. 2, and is designated generally throughout by reference numeral 100.

As embodied herein, and depicted in FIG. 1, a diagrammatic depiction of a transmitter 10 in accordance with the present invention is disclosed. A Multiple Input Multiple Output (MIMO) waveform diversity radar architecture is shown in FIG. 1. The antenna 12 includes a plurality of antenna elements 12-1. These antenna elements 12-1 are divided among a plurality of subapertures 14-1 . . . 14-P, where P is an integer. The term subarray is often used in place of the term subaperture. Each subarray 14 is configured to transmit an orthogonal signal ($\phi_1$–$\phi_P$). As those skilled in the art will appreciate, the cross correlation of two orthogonal signals is zero, and therefore, orthogonal signals are employed because they can be distinguished from each other during detection by the receiver.

Figure 2:
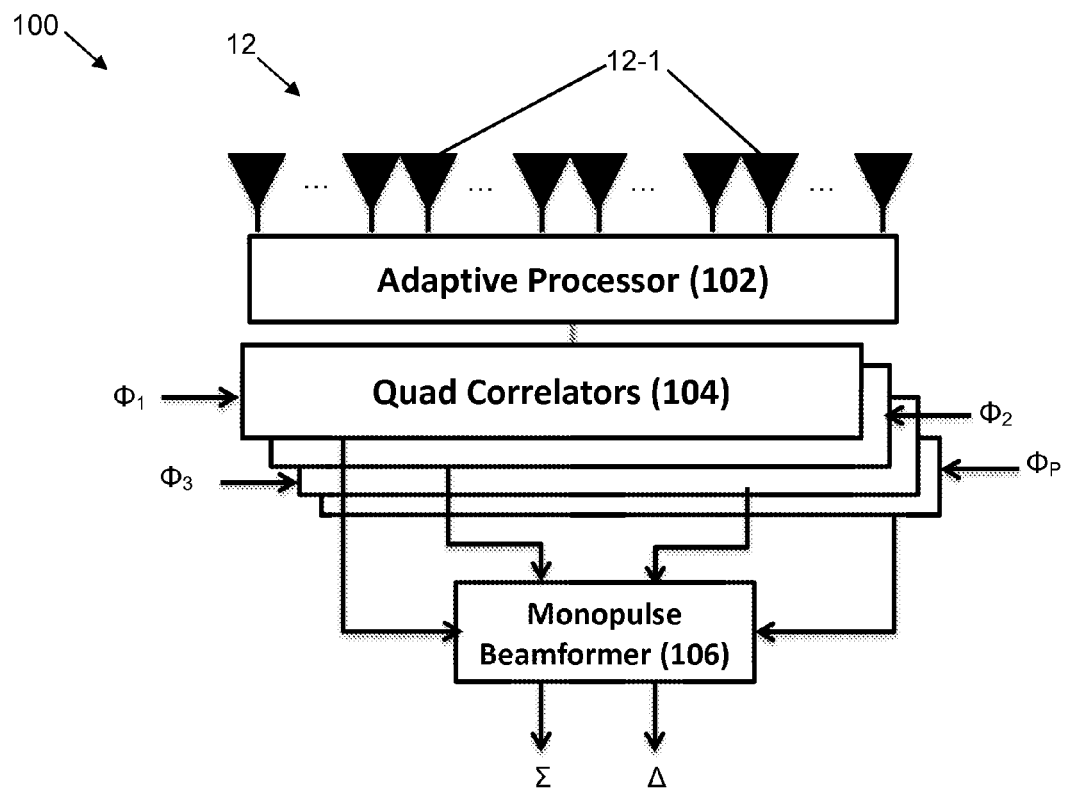
FIG. 2 is a diagrammatic depiction of a receiver in accordance with the present invention.

As embodied herein and depicted in FIG. 2, a diagrammatic depiction of a MIMO receiver 100 in accordance with the present invention is disclosed. There is no need for sub-arraying in the receive aperture, and, in fact, the receive aperture need not be the same as the transmit aperture (although in an alternative embodiment it can be). A jamming cancellation adaptive processor 102 is coupled to the antenna 12 and is configured to determine weighting factors that are applied to the output of each antenna element 12-1. The weighted antenna outputs are summed, and this sum is applied to as many correlators as there are transmitted waveforms in the correlator bank 104 because each antenna element can receive each orthogonal signal scattered from the target. Each correlator is implemented by a matched filter which is configured to pass only one of the orthogonal signals employed by the system and not pass any of the others. The same jammer cancellation weights are applied to all orthogonal waveforms because each orthogonal waveform has traversed the same antenna elements, feedlines, and receivers.

Looking at the system as a whole, and unlike conventional systems, much of the angle estimation information is spatially embedded in the transmit waveforms by virtue of the orthogonal waveforms. In other words, since the transmit array consists of P subarrays, with each array corresponding to one orthogonal signal; each orthogonal signal is a function of its corresponding subarray position relative to the overall antenna. Because the system software knows precisely where in the array that a certain orthogonal signal originated from, this information can be used on the receive side for angle estimation purposes. Thus, in contrast with conventional monopulse, the angle estimation calibration table is determined from measurements of the transmit antenna patterns instead of the receive antenna patterns.

On the receive side, the sum and difference beams are formed by the monopulse beamformer 106 by proper combinations of the adaptive post-cancellation outputs. Because the adaptive weights used for the sum and difference beams are identical for each orthogonal waveform (see above), the weights are distributed throughout the expressions for both the difference beam and the sum beam. The weights, of course, cancel the jamming signal when applied thereto. Additionally, in forming the monopulse ratio by dividing the jamming-suppressed difference beam by the jamming-suppressed sum beam, for small jamming plus noise residue (that remaining after jammer cancellation) the factors containing the weights divide out and so the weights do not appreciably affect the monopulse ratio. Thus, as verified by FIGS. 7-9 of a simulation described below, the monopulse ratio is virtually independent of any pattern distortion arising from jamming cancellation. In other words, the monopulse angle estimation accuracy does not deteriorate with jammer cancellation. In effect, this system nulls jamming on receive and performs monopulse angle estimation on transmit because each orthogonal waveform signal is transmitted from a unique transmit phase center and the correlators preserve this distinction on receive. The entire receive aperture is available for jammer cancellation and the entire receive aperture is available for monopulse angle estimation. Thus, there is no sharing of the aperture between these functions and no consequential compromise of cancellation and angle estimation, as previously discussed.

Figure 3A:
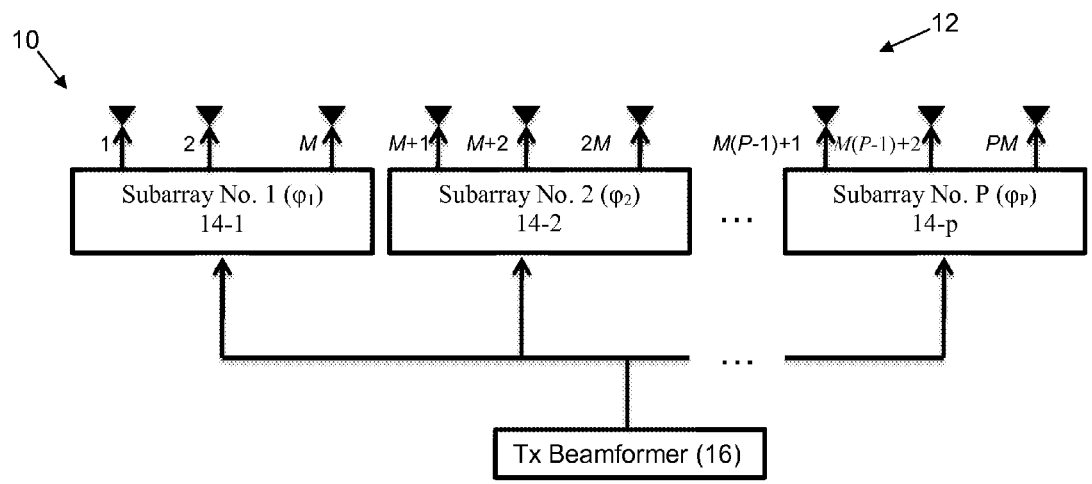
FIG. 3A is a detailed schematic of a linear array embodiment of the transmitter depicted in FIG. 1.

Referring to FIG. 3A, a detailed schematic of a linear array embodiment of the transmitter 10 depicted in FIG. 1 is disclosed. The antenna 12 is a uniform linear array of PM omnidirectional radiating elements spaced d apart. Each antenna element 12-1 in a M-element subarray (subarrays denoted as 14-1 ... 14-P) is connected to a transmit beamformer 16 so that it radiates a unique orthogonal waveform signal ($\phi_p$) that, upon reception, is distinguishable from the others. As described above, the orthogonal waveform is associated to a position on the uniform linear array by virtue of it being transmitted from one and only one subarray.

Figure 3B:
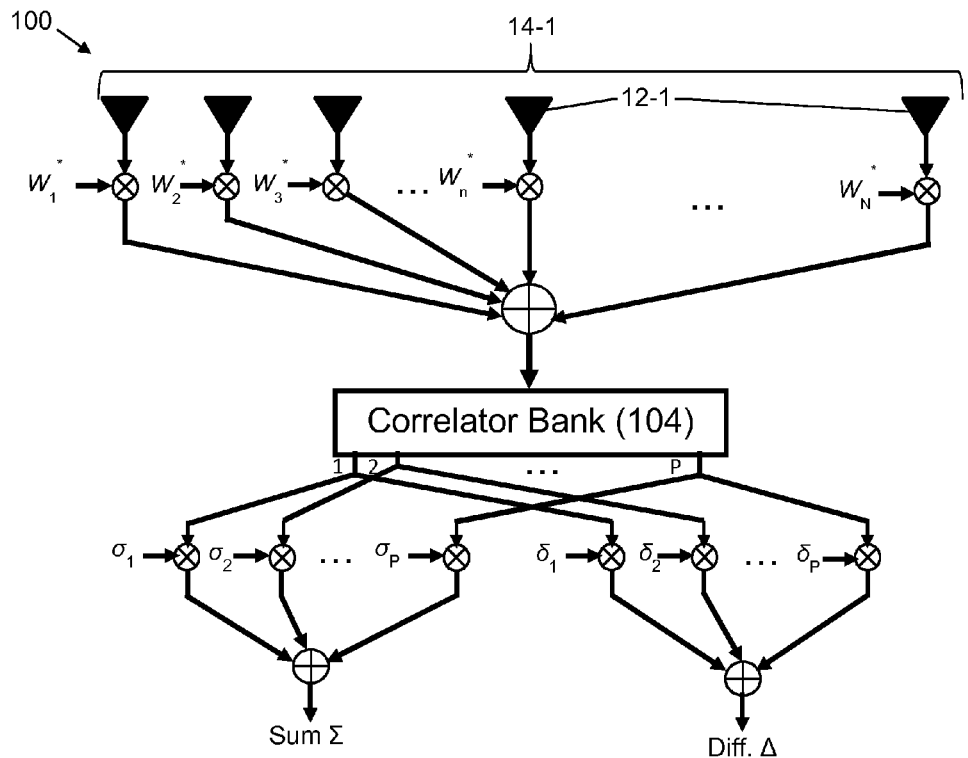
FIG. 3B is a detailed schematic of a linear array embodiment of the receiver depicted in FIG. 2.
Figure 4:
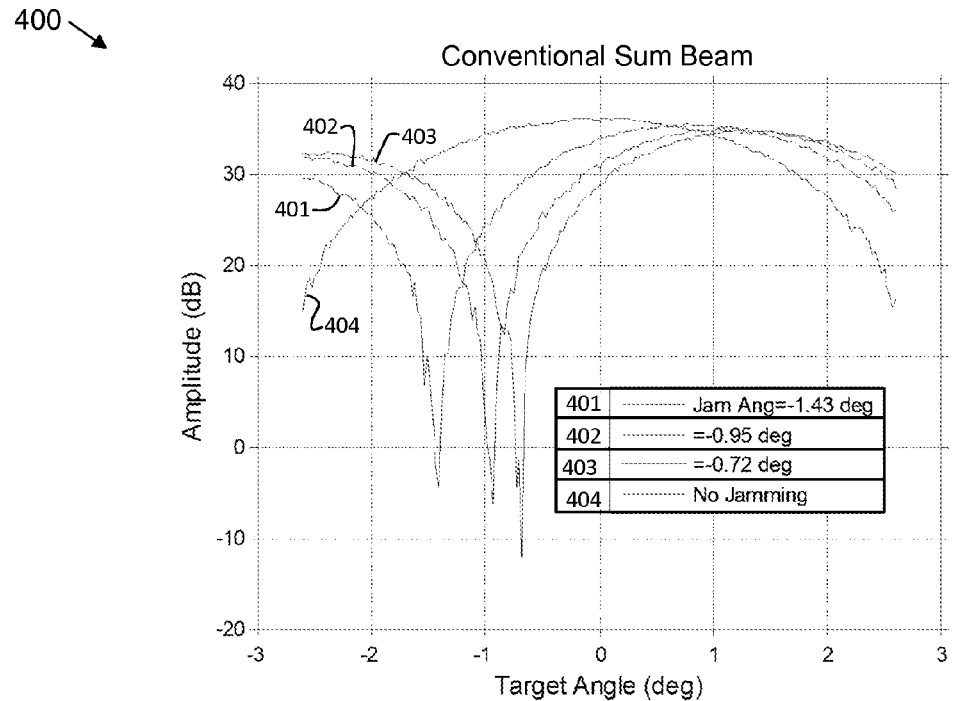
FIG. 4 is a chart illustrating the post adaptive sum beam for a conventional system.
Figure 5:
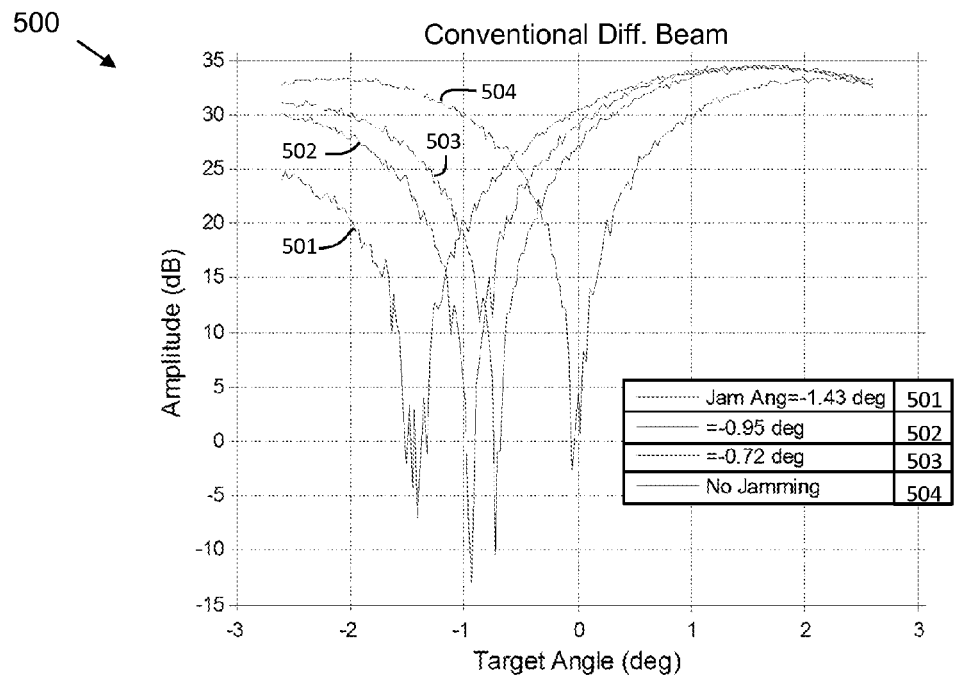
FIG. 5 is a chart illustrating the post adaptive difference beam for a conventional system.
Figure 6:
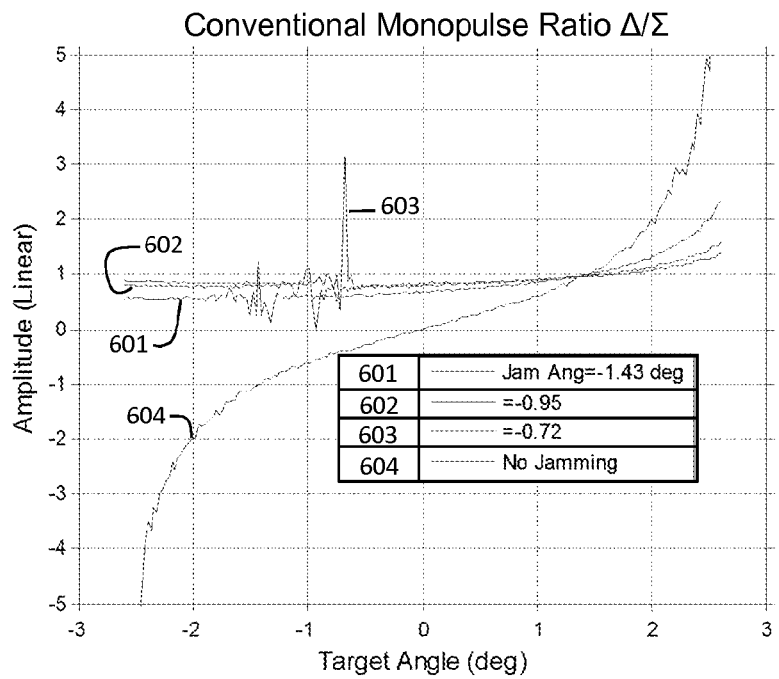
FIG. 6 is a chart illustrating the angle estimation ratio using the sum beam (FIG. 4) and difference beam (FIG. 5) for the conventional system.

Referring to FIG. 3B, a detailed schematic of the receiver 100 depicted in FIG. 2 is disclosed. In this view, the outputs of the antenna elements 12-1 in subarray 14-1 are linearly combined with jammer cancellation weighting factors $w_n$, where "n" is an integer value within the range between 1 and N. Accordingly, there are N weights applied to each of the N antenna outputs for a given orthogonal waveform, and these weights are the same for each waveform. As noted briefly above, the weighted antenna outputs are provided to each of P matched filters in the correlator bank 104. Each matched filter is "tuned" to one orthogonal waveform and is thus configured to pass only the signals corresponding to that waveform and reject all others. The orthogonal waveforms then are linearly combined with sum and difference weights $\phi_p$ and $\delta_p$ respectively into sum and difference beams (106-1, 106-2). The analysis is provided more formally below:

P denotes the number of subarrays (subapertures) fed by the transmit beamformer, M denotes the number of elements in a transmit subarray, $w_n$ denotes the adaptive weight applied to the nth element of N elements on receive, $\sigma_p$ denotes the sum beam weight applied, on receive, to the signals transmitted with the pth waveform, and $\delta_p$ denotes the difference beam weight applied, on receive, to the signals transmitted with the pth waveform. (For simplicity of exposition, the inter-element spacing, d, is assumed to be the same for the transmit array as for the receive array. In general, the transmit array spacing and receive array spacing can differ.)

Let all angles be referenced to zero at broadside to the array. $\theta$ denotes the target angle, and $\theta_j$ denotes the jammer angle. The relative phase advance in the transmit path to the target of the signal from the kth element in the pth subarray is given by:

$$\psi_t(p,k) = \frac{2\pi}{\lambda}\left(\left((p-1)M + k - \frac{N+1}{2}\right)d\sin\theta\right),$$

where $\lambda$ denotes the wavelength. The relative phase advance of the radar signal from the target to the nth receive element is given by $$\psi_r(n) = \frac{2\pi}{\lambda}\left(\left(n - \frac{N+1}{2}\right)d\sin\theta\right)$$

The relative phase advance of the jamming signal to the nth receive element is given by $$\psi_j(n) = \frac{2\pi}{\lambda}\left(\left(n - \frac{N+1}{2}\right)d\sin\theta_j\right)$$

Let SNRG denote the radar signal to noise power ratio in one receive channel including the correlator processing gain, and JNR denote the jamming signal to noise power ratio in one receive channel. Then, the sum and difference signals are given by:

$$S = \sum_{p=1}^{P} \sigma_p$$

$$\sum_{n=1}^{N} w_n^* \left( e^{j\psi_r(n)} \frac{\sqrt{SNRG}}{M} \sum_{m=1}^{M} e^{j\psi_t(p,m)} + \sqrt{JNR} \, e^{j\psi_j(n)} \gamma(p) + v(n,p) \right)$$

$$D = \sum_{p=1}^{P} \delta_p \sum_{n=1}^{N} w_n^* \left( e^{j\psi_r(n)} \frac{\sqrt{SNRG}}{M} \sum_{m=1}^{M} e^{j\psi_t(p,m)} + \sqrt{JNR} \, e^{j\psi_j(n)} \gamma(p) + v(n,p) \right)$$

where $v(n, p)$, $\gamma(p)$ denote unity variance complex Gaussian noise samples. The sum and difference weights are given by:

$$\sigma_p = \frac{1}{\sqrt{P}} \quad p = 1, 2, \ldots, P$$

$$\delta_p \begin{cases} \frac{-1}{\sqrt{P}} & p = 1, 2, \ldots, P/2 \\ \frac{1}{\sqrt{P}} & p = \frac{P}{2}+1, \frac{P}{2}+2 \ldots, P \end{cases}$$

for P even. (A similar expression holds for P odd.)
The adaptive nulling weights are given by the vector matrix equation $$w = R^{-1} s$$

where $$R = (JNR)R' + I$$

I denotes the identity matrix, the mnth element of the matrix R' is given by $$(R')_{mn} = e^{j(\Omega_j(m) - \Omega_j(n))}$$

and the nth element of the steering vector s is unity, corresponding to a broadside beam. The weights are normalized to unity norm (i.e., $w^H w = 1$ where superscript H denotes Hermitian).

The angle estimation ratio is given by:

$$r = \text{real}(D/S)$$

When the jamming plus noise residue (the residual jamming and noise remaining following jammer cancellation) is small, the sum and difference equations reduce to $$S = \sum_{p=1}^{P} \sigma_p \frac{\sqrt{SNRG}}{M} \sum_{m=1}^{M} e^{j\psi_t(p,m)} \sum_{n=1}^{N} w_n^* e^{j\psi_r(n)}$$

$$D = \sum_{p=1}^{P} \delta_p \frac{\sqrt{SNRG}}{M} \sum_{m=1}^{M} e^{j\psi_t(p,m)} \sum_{n=1}^{N} w_n^* e^{j\psi_r(n)}$$

and the angle estimation ratio reduces to $$r = \text{real}\left\{ \sum_{p=1}^{P} \delta_p \frac{\sqrt{SNRG}}{M} \sum_{m=1}^{M} e^{j\psi_t(p,m)} \bigg/ \sum_{p=1}^{P} \sigma_p \frac{\sqrt{SNRG}}{M} \sum_{m=1}^{M} e^{j\psi_t(p,m)} \right\}$$

Note the absence of jammer cancellation weights. This is the reason this MIMO method preserves monopulse angle estimation while cancelling mainlobe jamming. Note also that calibration of the transmit beamformer, as opposed to the receive beamformer, is essential for accurate angle estimation by this method.

The processes described above are typically implemented by a computer system that includes one or more processors coupled to an address, data and control bus that is configured to direct data and control information as appropriate. The computer system also includes various kinds of computer readable medium used for storing the information and instructions that are executed by the processor. The computer readable medium can also be used for storing temporary variables or other intermediate information during execution of programming instructions by the processor. Computer readable media may also be used to store static information and instructions for the processor. According to one embodiment of the invention, the processes of the present invention are performed by a computer system in response to a processor executing an arrangement of instructions. One or more processors in a multi-processing arrangement may also be employed to execute the instructions contained in system memory. In alternative embodiments, hard-wired circuitry may be used in place of, or in combination with, software instructions to implement the embodiment of the present invention. Non-limiting examples of such circuits include application specific integrated circuits, gate array circuits, and the like. Thus, embodiments of the present invention are not limited to any specific combination of hardware circuitry and software.

The processing system described above may include interface circuitry that is implemented using any suitable device or combination of devices. For example, the processing circuitry may be coupled to a graphical user interface to display information. The display may be implemented using any suitable device(s) including liquid crystal display, a cathode ray tube (CRT), active matrix display, plasma display, etc. The interface may include audio components as well. The interface circuitry may include an input device for communicating information and command selections to the processor circuitry. The input device may include a keyboard that has alphanumeric and other keys, or a cursor control device, such as a mouse, a trackball, or cursor direction keys, for communicating direction information and command selections to the processor circuitry (and for controlling cursor movement on the display.

The system of the present invention can include a communication interface that couples the radar transmitter 10 and receiver system 100 to a network such as a local area network (LAN) or a wide area network (WAN). Wireless links can also be employed with the present invention. In any such implementation, the communication interface may be configured to send and receive electrical, electromagnetic, or optical signals that carry digital data streams representing various types of information. The communication interface(s) may be implemented using one or more fiber optic modems, wireless interfaces, digital subscriber line (DSL) cards or modems, integrated services digital network (ISDN) cards, cable modems, telephone modems, or any other suitable communication interfaces configured to provide one or more data communication connections to corresponding types of communication lines. The communication interface may also be employed to provide the processor circuitry with data, including programming code, through the aforementioned network(s). With respect to the Internet, a server (not shown) might be employed to remotely monitor the radar system (10, 100) or remotely program or revise the programming resident in the processor circuit described above.

Further, the interface circuitry may be equipped with peripheral interface devices, such as a Universal Serial Bus (USB) interface, a PCMCIA (Personal Computer Memory Card International Association) interface, etc. The system may include multiple communication interfaces.

The term "computer-readable medium" as used herein refers to any medium that participates in providing data and/or instructions to the processor for execution. Such a medium may take many forms, including but not limited to non-volatile media, volatile media, and/or transmission media. Common forms of computer-readable media include, for example, various types of RAM, ROM (PROM, EPROM, EEPROM, etc.) FLASH-EPROM, any other memory chip or cartridge, a carrier wave, or any other medium from which a computer can read. Various types of optical and magnetic disks are known to be employed as computer-readable media. Thus, the present invention may employ a floppy or flexible disk, a hard disk, a magnetic tape, a CD-ROM, CDRW, DVD, USB device, punch cards, paper tape, optical mark sheets, and any other physical medium with patterns of holes or other optically recognizable indicia, or any other electrical, magnetic or optical medium.

Transmission media include coaxial cables, copper wire, or fiber optics. Transmission media can also take the form of acoustic, optical, or electromagnetic waves, such as those generated during radio frequency (RF) and infrared (IR) data communications.

Figure 7:
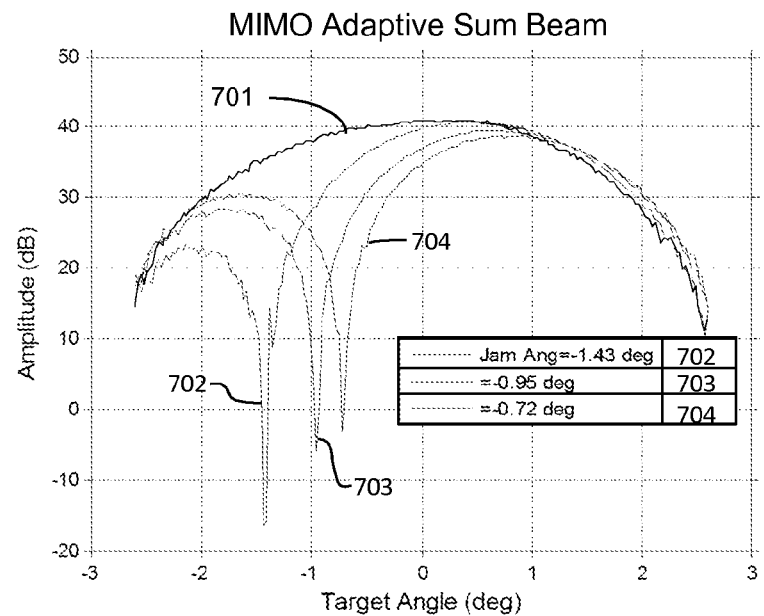
FIG. 7 is a chart illustrating the sum pattern for the system of the present invention.

Referring to FIG. 7, a chart illustrating the sum beam pattern for the linear array embodiment of the system of the present invention is disclosed. (The above equations were applied in generating the charts of FIGS. 4-9.) The line 701 represents the no jamming case. The other lines apply when the jammer is present and located at the three different angles indicated.

Figure 8:
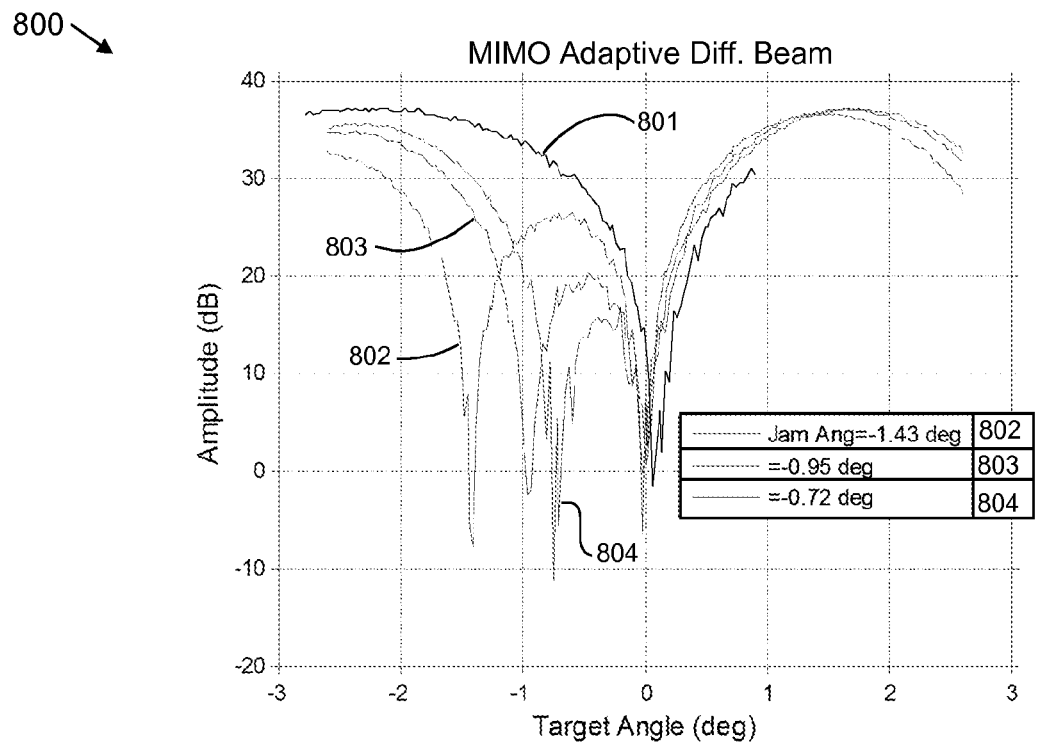
FIG. 8 is a chart illustrating the difference pattern for the system of the present invention.

Referring to FIG. 8, a chart illustrating the difference pattern for the system of the present invention is disclosed. Line 801 represents the no jamming case and lines 802-806 apply to the three jammer cases. Again, the adaptive weights produce nulls in the direction of jamming. Moreover, the MIMO difference beam differs from the conventional difference beam because all four plot lines produce a null at the boresight (target angle 0°); in the conventional system (FIG. 5), the center nulls for the jamming cases were merely replaced with nulls in the jamming directions.

Figure 9:
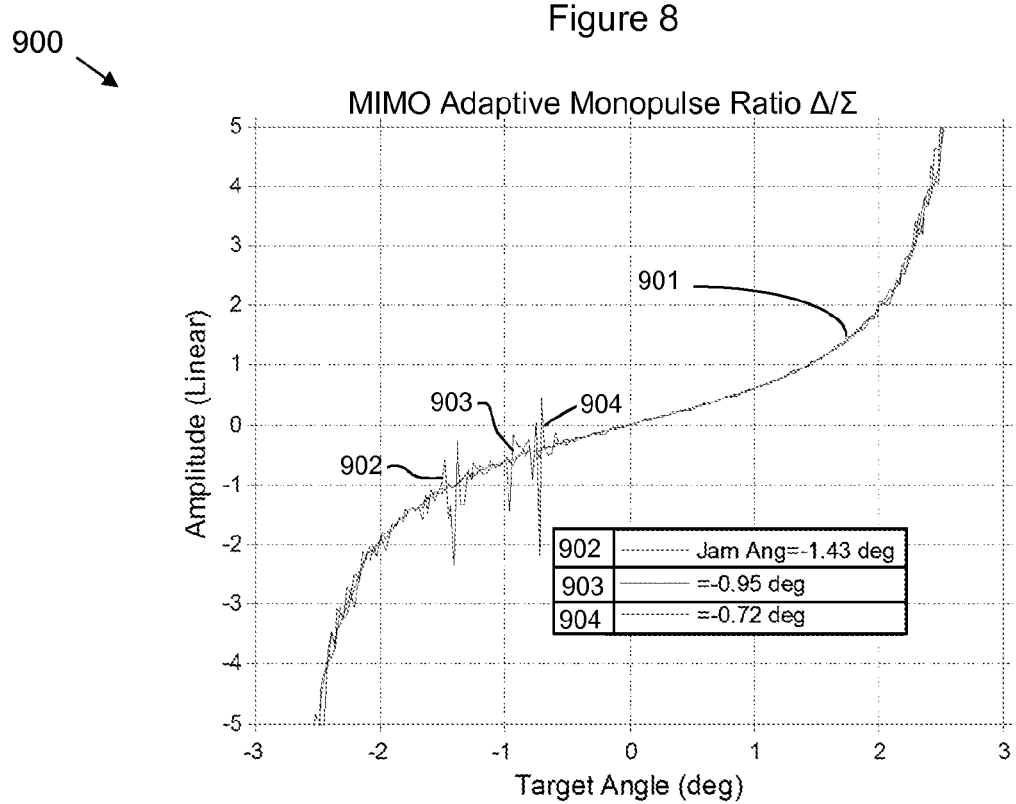
FIG. 9 is a chart illustrating the angle estimation ratio using the sum beam (FIG. 7) and difference beam (FIG. 8) for the system of the present invention.

In reference to FIG. 9, a chart illustrating the angle estimation ratio using the sum beam (FIG. 7) and difference beam (FIG. 8) is disclosed. All of the plots (including those for the three jamming angles) follow the expected "s-shaped" curve—clearly the angle estimation ratio is well preserved and nearly independent of jamming. Because the monopulse beams are formed after the adaptive weights are applied, the performance is maintained (except in the immediate vicinity of the jammer).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A radar system configured to detect at least one target, the system comprising:
  a transmit antenna array including a plurality of antenna elements arranged within a plurality of subarrays, each subarray being disposed at predetermined position relative to an antenna array boresight;
  a transmit beamformer coupled to the transmit antenna array, the transmit beamformer being configured to generate a plurality of unique transmit waveforms, each of the unique transmit waveforms being directed to a corresponding one of the plurality of subarrays such that each of the plurality of antenna elements within a subarray transmits the same unique transmit waveform;
  an adaptive processor coupled to a receive antenna array and configured to derive a plurality of adaptive weight factors from a plurality of receive signals provided by the plurality of antenna elements, the adaptive processor applying the plurality of adaptive weight factors to each subarray to provide a plurality of weighted signals;
  a correlator system including a plurality of correlator elements coupled to the adaptive processor, each correlator element being configured to detect signal components corresponding to one unique transmit waveform from each of the plurality of weighted signals and provide one unique weighted receive waveform based on the detected signal components, whereby the correlator system provides a plurality of unique receive waveforms substantially corresponding to the plurality of unique transmit waveforms; and a receive beamformer coupled to the correlation system, the receive beamformer configured to derive an angular estimate of at least one target relative to the boresight from the plurality of unique receive waveforms.

2. The system of claim 1, wherein the plurality of antenna elements are arranged in a linear array.

3. The system of claim 1, wherein the plurality of antenna elements are comprised of broad beam radiating elements.

4. The system of claim 3, wherein the broad beam radiating elements include isotropic radiating elements.

5. The system of claim 1, wherein the plurality of unique transmit waveforms are a plurality of orthogonal waveforms.

6. The system of claim 1, wherein each of the plurality of unique transmit waveforms are characterized by a unique Doppler offset.

7. The system of claim 1, wherein each of the plurality of unique transmit waveforms are characterized by a unique time delay.

8. The system of claim 1, wherein the angular estimate is derived from a monopulse ratio.

9. The system of claim 1, wherein the receive beamformer includes a sum beamformer and a difference beamformer, the sum beamformer being configured to provide a sum beam that is a function of the plurality of adaptive weight factors and the difference being configured to provide a difference beam that is a function of the plurality of adaptive weight factors, and wherein a ratio of the difference beam and the sum beam is not a function of the plurality of adaptive weight factors.

10. The system of claim 1, wherein the receive beamformer includes a sum beamformer configured to provide a sum beam substantially equal to:

$$S = \sum_{p=1}^{P} \sigma_p$$

$$\sum_{n=1}^{N} w_n^* \left( e^{j\psi_r(n)} \frac{\sqrt{SNRG}}{M} \sum_{m=1}^{M} e^{j\psi_t(p,m)} + \sqrt{JNR}\, e^{j\psi_r(n)} \gamma(p) + v(n, p) \right),$$

wherein $w_n^*$ corresponds to the plurality of adaptive weight factors.

11. The system of claim 10, wherein the term $\sqrt{JNR}$ corresponds to a jamming signal, the jamming signal causing the adaptive weights to generate a null in the sum beam at an angle corresponding to a jamming direction.

12. The system of claim 1, wherein the receive beamformer includes a difference beamformer configured to provide a difference beam substantially equal to:

$$D = \sum_{p=1}^{P} \delta_p$$

$$\sum_{n=1}^{N} w_n^* \left( e^{j\psi_r(n)} \frac{\sqrt{SNRG}}{M} \sum_{m=1}^{M} e^{j\psi_t(p,m)} + \sqrt{JNR}\, e^{j\psi_r(n)} \gamma(p) + v(n, p) \right).$$

13. The system of claim 12, wherein the term $\sqrt{JNR}$ corresponds to a jamming signal, the jamming signal causing the adaptive weights to generate a null in the difference beam at an angle corresponding to a jamming direction, the difference beam further including a null substantially aligned to the antenna array boresight.

14. The system of claim 1, wherein a ratio of the difference beam over the sum beam is a monopulse ratio corresponding to:

$$r = \mathrm{real} \left\{ \sum_{p=1}^{P} \delta_p \frac{\sqrt{SNRG}}{M} \sum_{m=1}^{M} e^{j\psi_t(p,m)} \Big/ \sum_{p=1}^{P} \sigma_p \frac{\sqrt{SNRG}}{M} \sum_{m=1}^{M} e^{j\psi_t(p,m)} \right\}.$$

15. The system of claim 14, wherein the monopulse ratio is a function of the plurality of unique transmit waveforms.

16. The system of claim 14, wherein a plot of the monopulse ratio is an antisymmetrical pattern having substantially no amplitude at an angle corresponding to the antenna array boresight.

17. The system of claim 14, wherein the monopulse ratio maintains the antisymmetrical pattern in the presence of the jamming signal.

18. The system of claim 14, further comprising a processor coupled to the receive beamformer, the processor being configured to derive a target angle relative to the antenna array boresight based on the monopulse ratio.

19. The system of claim 18, wherein the processor is coupled to a display element, the display element being configured to provide a graphical depiction of the target angle.

20. The system of claim 1, wherein the each of the correlator elements includes a matched filter configured to detect a predetermined orthogonal waveform.

21. The system of claim 1, wherein the receive antenna array and the transmit antenna array are separate antenna arrays.

* * * * *